(12) United States Patent
Huang

(10) Patent No.: US 7,006,405 B1
(45) Date of Patent: Feb. 28, 2006

(54) PORTABLE ULTRASOUND HEIGHT MEASURING APPARATUS

(75) Inventor: Lung-Hsi Huang, Dali (TW)

(73) Assignee: Kyooh Precision Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 10/969,857

(22) Filed: Oct. 22, 2004

(51) Int. Cl.
*G01S 15/08* (2006.01)
*G01S 15/00* (2006.01)

(52) U.S. Cl. .................. 367/107; 367/99; 367/910
(58) Field of Classification Search ............ 367/99, 367/107, 910
See application file for complete search history.

(56) References Cited

U.S. PATENT DOCUMENTS 6,847,586 B1 * 1/2005 Chen ...................... 367/99

2005/0155246 A1 * 7/2005 Montagnino ............ 33/832
2005/0171451 A1 * 8/2005 Yeo et al. ............... 600/547

FOREIGN PATENT DOCUMENTS

JP            10211189 A   *  8/1998

* cited by examiner

*Primary Examiner*—Ian J. Lobo
(74) *Attorney, Agent, or Firm*—Rosenberg, Klein & Lee

(57) ABSTRACT

A portable ultrasound height measuring apparatus, which comprises a display module and a measuring module. Wherein the display module comprises a LCD, a speaker, a transparent plank and a skidproof pad. The measuring module comprises an ultrasound emitter, an ultrasound receiver, a start button, a set fingerboard, and under the set fingerboard a microprocessor. The apparatus measures height of measured person by emitting an ultrasound signal from the emitter and receiving a reflecting signal by the receiver, then displays value on the LCD. The display module and measuring module are jointly connected together to make the display module able to rotate, open, and close in a set range of angle relative to the measuring module.

5 Claims, 7 Drawing Sheets

PORTABLE ULTRASOUND HEIGHT MEASURING APPARATUS

BACKGROUND OF THE INVENTION

1. Field of the Invention

The present invention relates generally to portable ultrasound height measuring apparatus and, more particularly, to a portable ultrasound height measuring apparatus having an emitter emitting ultrasound, a receiver receiving signal, then calculating the height.

2. Description of the Prior Art

Conventionally used height measuring apparatuses are not various. Typical methods are using measuring tape, using paper ruler pasted on wall, using height gauge attached with a weight gauge, using headstand-L shape height gauge, wherein the most inventive one is coin, electrical height gauge with digital display panel.

Each conventionally used apparatus has its own disadvantages, as illustrated below:

1. The method of using a measuring tape. This one is the most usual way used in family for knowing growth distribution of children. It comprises steps of:
   measured person stands closely to a wall;
   measuring person uses a hard plate or a ruler to slightly touch head top of measured person, and makes the hard plate or ruler perpendicular to the wall;
   measuring person marks height of measured person on the wall;
   measuring person uses a ruler to measure height from floor to the mark on the wall after measured person leaves.

This method has some disadvantages. One is it is hard to make the hard plate or ruler perpendicular to the wall. Another is the measuring ruler is hard to keep parallel to the original position of measured person. These all cause error of measurement. Moreover, by increase of measuring times, the marks on the wall stain the wall.

2. The method of using a paper ruler pasted on a wall. This is generally used in a kindergarten or an elementary school, or child's bedroom. It comprises steps of:
   measured person stands closely to a paper ruler pasted on a wall;
   measuring person uses a hard plate or a ruler to slightly touch head top of measured person, and makes the hard plate or ruler perpendicular to the wall;
   measuring person directly read height from the paper ruler after the measured person leaves.

This method has some disadvantages similar to method 1. It is hard to make the hard plate or ruler perpendicular to the wall, and causes error of measurement.

3. The method of using a height gauge attached with a weight gauge. The combined apparatus is used in hospitals or health room in schools. It has some disadvantages. One is the combined apparatus is heavy and voluminous. Another is it is expensive to general families.

4. The method of using a headstand-L shape height gauge. The apparatus is also used in hospital or health room of schools. It has some disadvantages. One is the apparatus is heavy and long, which causes expensive shipment. Another is it is bad for decoration in family. Therefore seldom family uses it.

5. The method of using a coin, electrical height gauge with digital display panel. The apparatus is used in public place, e.g. stations, departments stores, super market, etc. It is a kind of business machine. The design of paying coin is located out of family use category. And it is voluminous and expensive, which is not suitable for family use.

In the aspect of height measuring, the method of using a headstand-L shape height gauge is popular. To solve the issue of expensive shipment, a Taiwan patent NO. 325673 (hereinafter recited patent) is brought. The recited patent has structural characteristics of 1.separated above and below aluminum products, base, slide rectangle furrow, and press plank to reduce shipment cost 2.the end of the above aluminum having a ladder-shape spacer to just fix with a fillister of the end of below aluminum 3.the ladder-shape spacer and the fillister both having a hole for screwing fix 4.fixing the combined above and below aluminum products on the base with screw 5.slipping the slide rectangle furrow into the combined above and below aluminum products. Improvement of the recited patent still cannot solve the disadvantageously heavy and long issues.

In modern society, parents more care about growing situation of children, and one index is the height growing distribution. The above-mentioned five kinds of conventional height measuring apparatus all have common or different disadvantages, wherein one of common disadvantages is that measuring person has to manually record, e.g. record in a notebook, the measuring date and value, or it is difficult to trace the height growing distribution of children.

In view of the above-mentioned disadvantages, the inventor develops a portable ultrasound height measuring apparatus, which is miniature, able to precisely measure height, and able to memory a plurality of data. The invention would make a easy, fast, convenient, and precise approach to height growing distribution of children. (Meanwhile the inventor is willing to bring technical convenience to general families.)

SUMMARY OF THE INVENTION

One aspect of the invention is to provide a portable ultrasound height measuring apparatus, which includes an emitter emitting ultrasound signal with fixed wavelength, a receiver receiving reflecting signal, then calculating the height of user.

Another aspect of the invention is to provide a miniature portable ultrasound height measuring apparatus, which is similar to general cell phone's size, not as conventional impression.

Another aspect of the invention is to provide a height measuring apparatus with memory function for measure date, measured height, and capacity of multi-records. It makes recording data easily.

A portable ultrasound height measuring apparatus achieving above aspects has:
   a display module, which has a pair of relative first top lid and first bottom lid. And where the first top lid relative to the first bottom lid has a container for a liquid crystal display (LCD), and a speaker fixture. The position of the first top lid relative to the container has a protective transparent plank for protecting the LCD. Moreover, on the far side of the first bottom lid relative to the first top lid, it embeds a skidproof pad;
   a measuring module, which has a pair of relative second top lid and second bottom lid. And where the second top lid relative to the second bottom lid has a fillister for a ultrasound emitter, ultrasound receiver, a set fingerboard, a microprocessor, and a start button. The position of the second bottom lid relative to the emitter and receiver respectively has a container for said emitter emitting signal and for said receiver receiving reflecting signal, and a power supply box having a fillister for the start button relative to the second top lid. The second top lid has a plurality of openings in respect to the set fingerboard. The microprocessor is located under the set fingerboard;

And said display module and said measuring module are jointly connected together via a pivot, which makes the display module able to rotate, open and close relative to the measuring module in a set range of angle.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
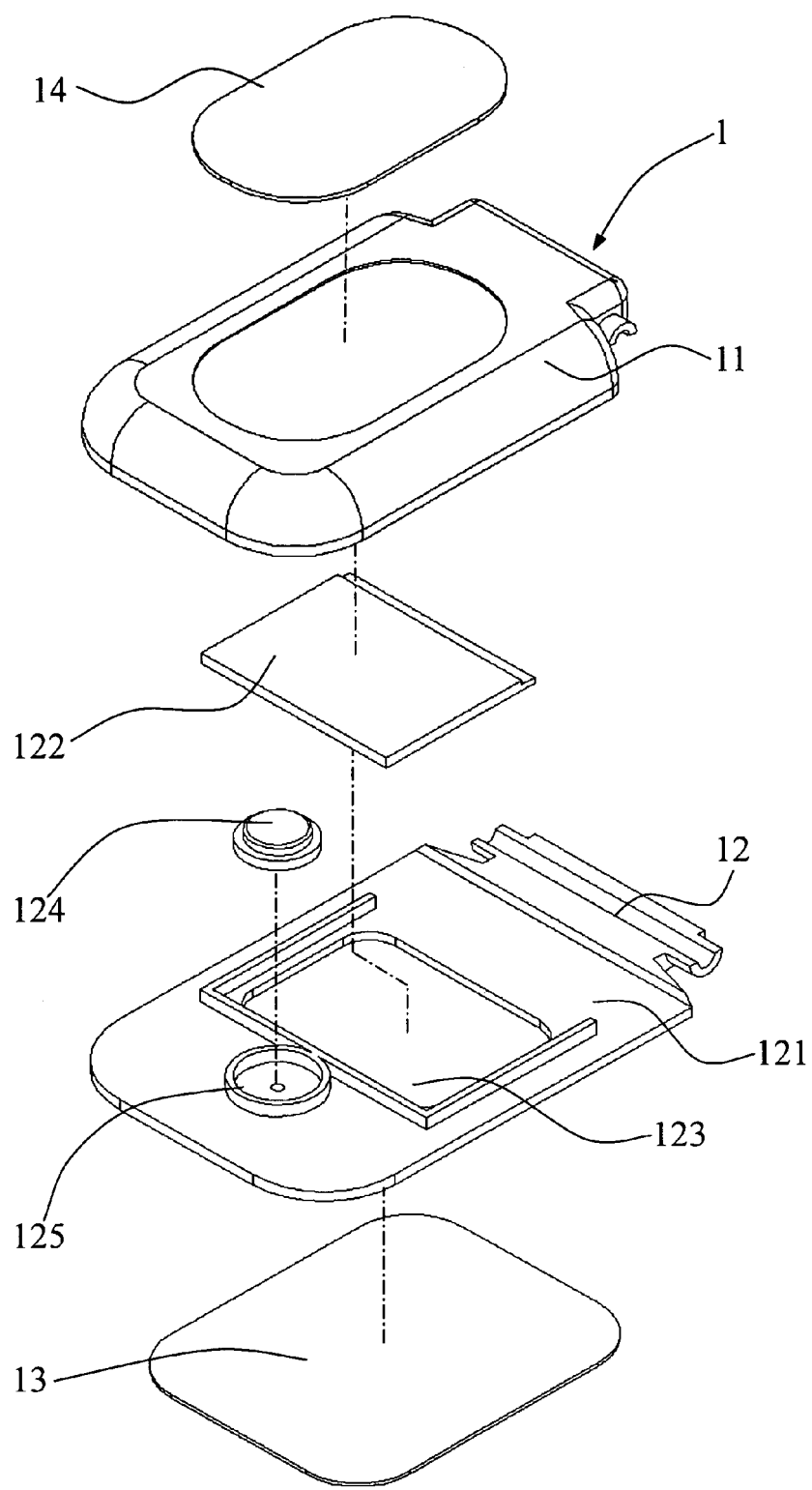
FIG. 1 shows an explosive diagram of a display module according to the invention.
Figure 2:
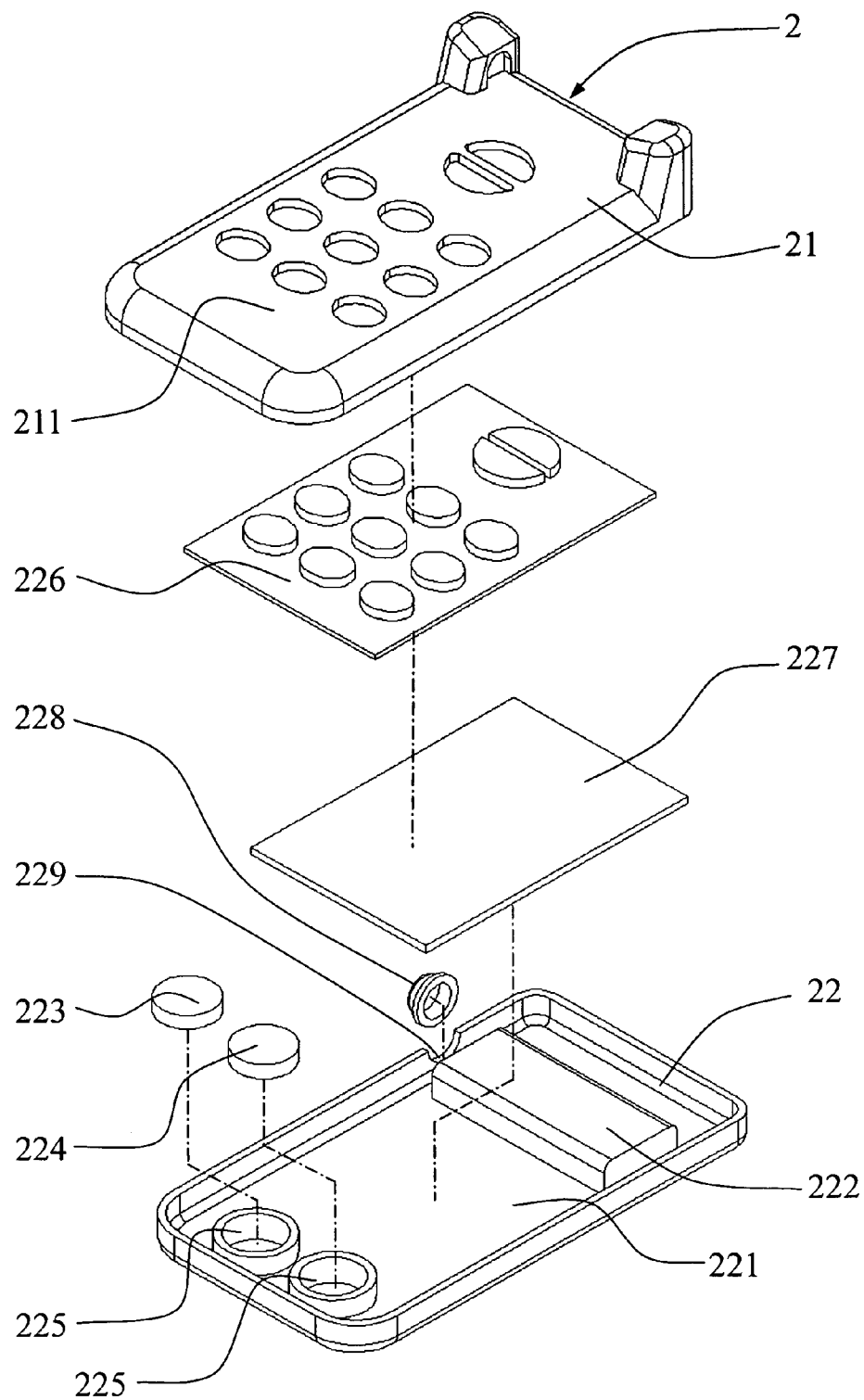
FIG. 2 shows an explosive diagram of a measuring module according to the invention.
Figure 3:
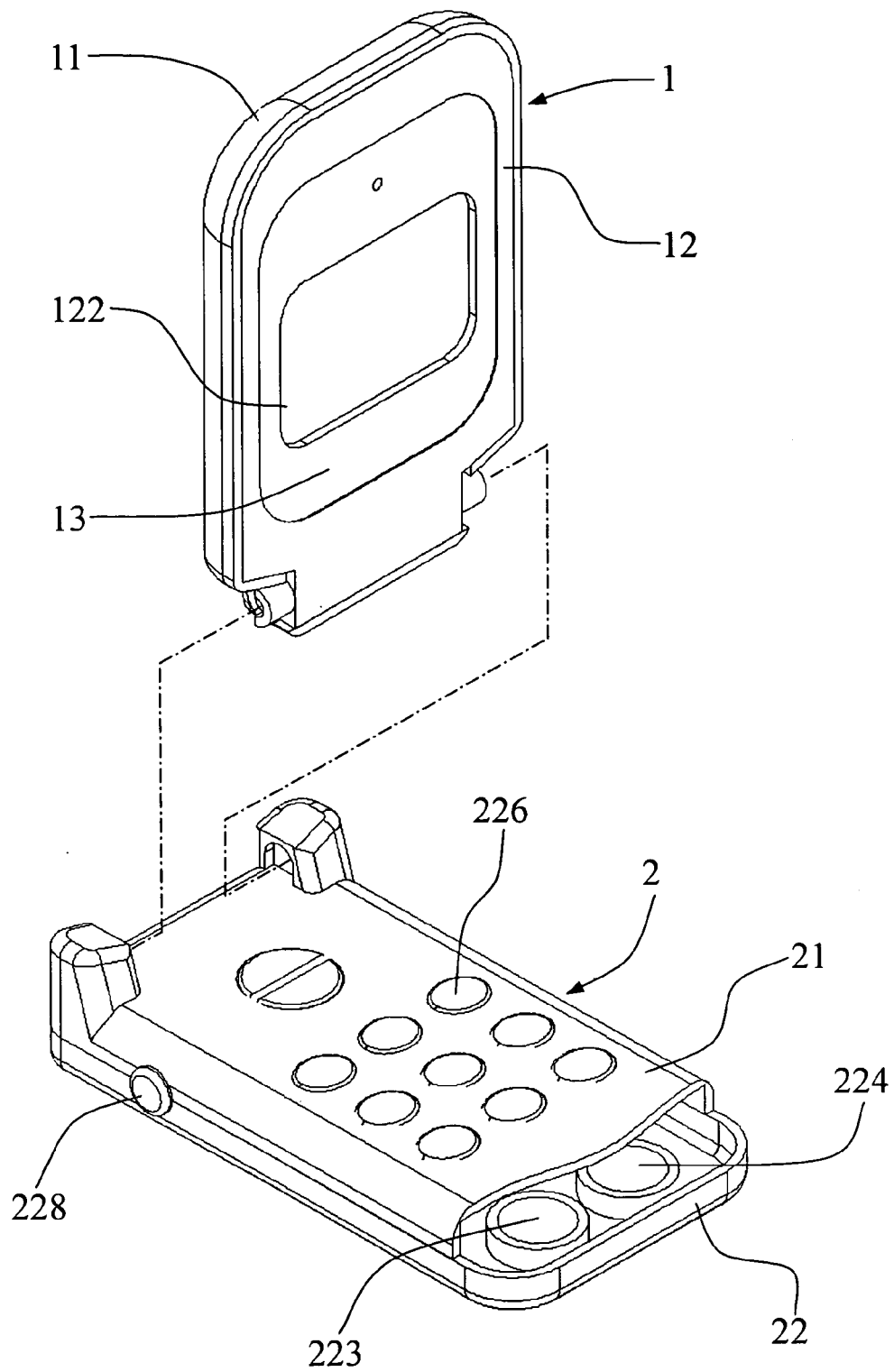
FIG. 3 shows a compositive diagram of a portable ultrasound height measuring apparatus according to the invention.

FIG. 1 to FIG. 3 show modules of a portable ultrasound height measuring apparatus.

FIG. 1 illustrates a display module 1, which has a pair of relative a first top lid 11 and a first bottom lid 12. This example shows rectangle of the lids as an example, other designs of shape are also suitable to the invention. And where the first top lid 11 relative to the first bottom lid 12 has a container 121 for a liquid crystal display (LCD) 122 fixed in a fillister 123, and a speaker fixture 125 for fixing a speaker 124, which makes sound of the height measuring apparatus. The position of the first top lid 11 relative to the fillister 123 has a protective transparent plank 14 for protecting the LCD 122. Moreover, on the far side of the first bottom lid 12 relative to the first top lid 11, it embeds a skidproof pad 13.

FIG. 2 illustrates a measuring module 2, which has a pair of relative second top lid 21 and second bottom lid 22. This example shows rectangle of the lids as an example, other designs of shape are also suitable to the invention. And where the second top lid 21 relative to the second bottom lid 22 has a fillister 221 for a ultrasound emitter 223, ultrasound receiver 224, a set fingerboard 226, a microprocessor 227, and a start button 228. The position of the second bottom lid 22 relative to the emitter 223 and receiver 224 respectively has a container 225 for said emitter 223 emitting signal and for said receiver 224 receiving reflecting signal, and a power supply box 222 which can open and close for displacing battery. The second top lid 21 has a plurality of openings 211 in respect to the set fingerboard 226. The microprocessor 227 is located under the set fingerboard 226. The second top lid 21 and second bottom lid 22 each has a half circular fillister 229 for fixing the start button 228.

FIG. 3 illustrates that said display module 1 and said measuring module 2 are jointly connected together via a pivot, which makes the display module 1 able to rotate, open and close relative to the measuring module 2 in a set range of angle (rotate and open angle can be 90 degree of 270 degree according to design).

Figure 4A:
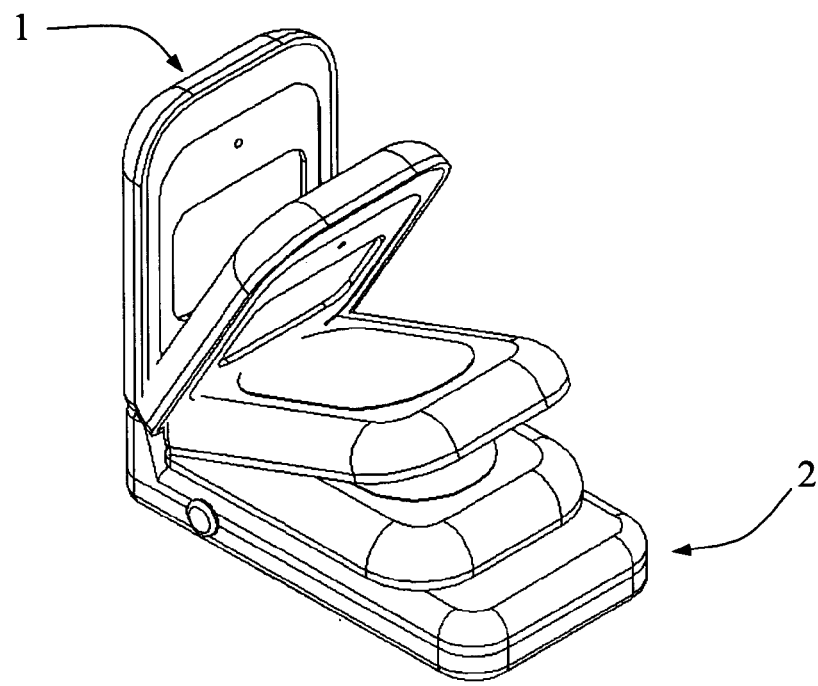
FIGS. 4(A), 4(B), 4(C), 4(D) show operation diagrams of according to the invention.
Figure 4B:
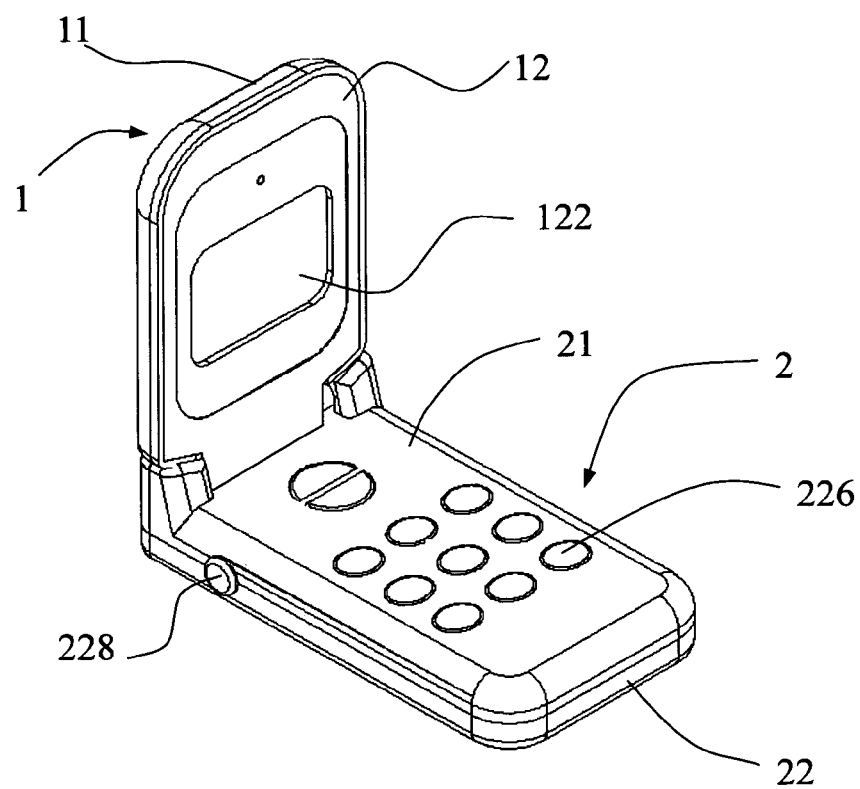
Figure 4C:
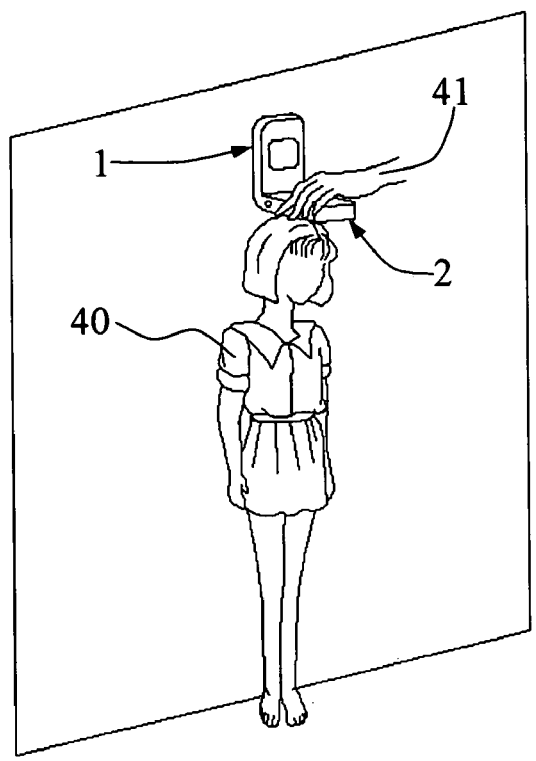
Figure 4D:
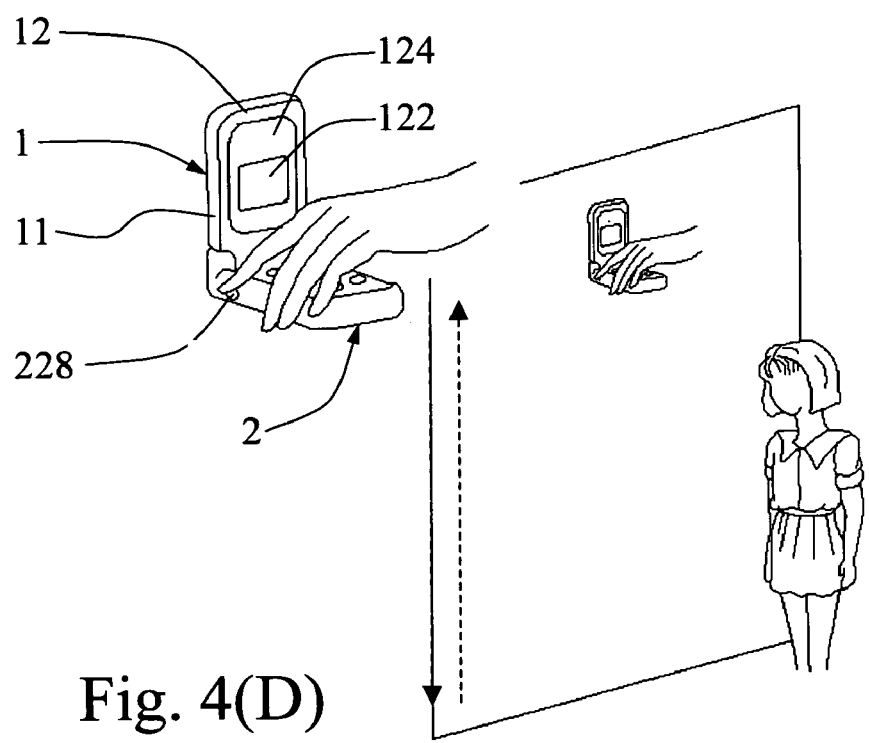

FIGS. 4(A), 4(B), 4(C), and 4(D) show operation diagrams of according to the invention. Operator opens the display module 1 perpendicular to the measuring module 2, as shown in FIGS. 4(A) and 4(B). A measured person 40 stands closely and parallel to a wall, as shown in FIG. 4(C). The operator 41 then puts the height measuring apparatus of the invention on the head top of the measured person 40, and makes the first top lid 11 close to the wall, the measuring module 2 perpendicular to the wall, then keeps the measuring apparatus static. The operator 41 then orders the measured person 40 leave, and press the start button 228. The measure is finished after a "be" sound, and the operator 41 can read height value from the LCD 122.

Principle of the invention is described below. The microprocessor 227 outputs digital signals, and a digital-to-analog amplifying loop of the emitter transfers the digital signals into analog signal. The analog signal is outputted to the ultrasound emitter 223 of the measuring module 2. The emitted ultrasound signal passes through air, then bounces from ground, and is received by the ultrasound receiver 224 of the measuring module 2. According to the time delay, the measured height can be calculated. The microprocessor 227 processes then outputs a read value on the LCD 122. Moreover, when the measure is finished, the speaker 124 makes a "be" sound to remind the operator 41 reading the value shown on the LCD 122.

Moreover, a portable ultrasound height measuring apparatus of the invention is able to input individual name via the microprocessor 227 to record height value and date of a measurement. And the height measuring apparatus is able to record a plurality of data for checking historical height records.

Figure 5:
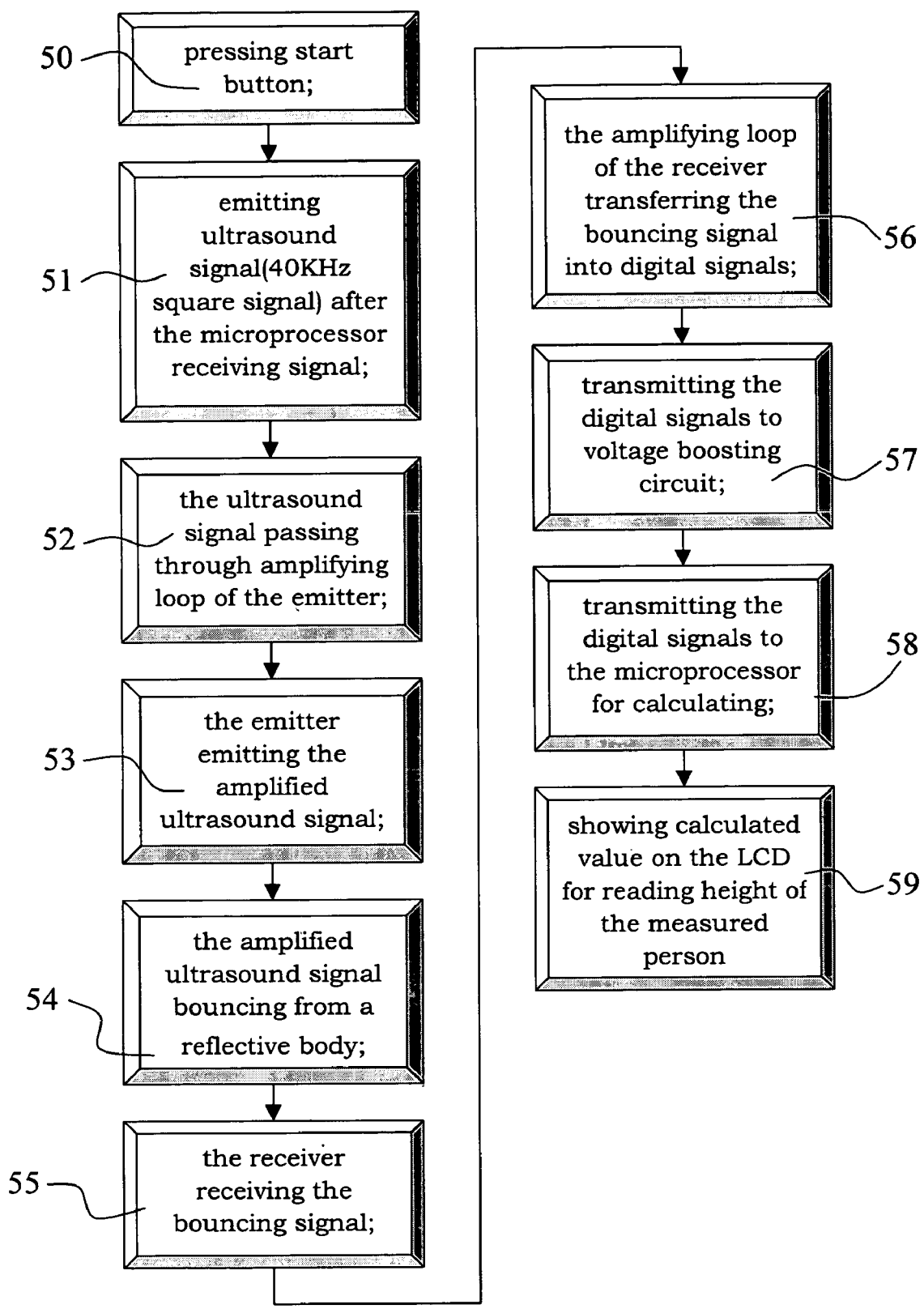
FIG. 5 shows a circuitry flow diagram according to the invention.

FIG. 5 shows a circuitry flow diagram according to the invention. The circuitry is triggered by the start button 228. It includes steps of:
  50,i.e.pressing start button;
  51,i.e.emitting ultrasound signal(40 KHz square signal) after the microprocessor receiving signal;
  52,i.e.the ultrasound signal passing through amplifying loop of the emitter;
  53,i.e.the emitter emitting the amplified ultrasound signal;
  54,i.e.the amplified ultrasound signal bouncing from a reflective body, e.g. ground;
  55,i.e.the receiver receiving the bouncing signal;
  56,i.e.the amplifying loop of the receiver transferring the bouncing signal into digital signals;
  57,i.e.transmitting the digital signals to voltage boosting circuit;
  58,i.e.transmitting the digital signals to the microprocessor for calculating; and
  59,i.e.showing calculated value on the LCD for reading height of the measured person.

Figure 6:
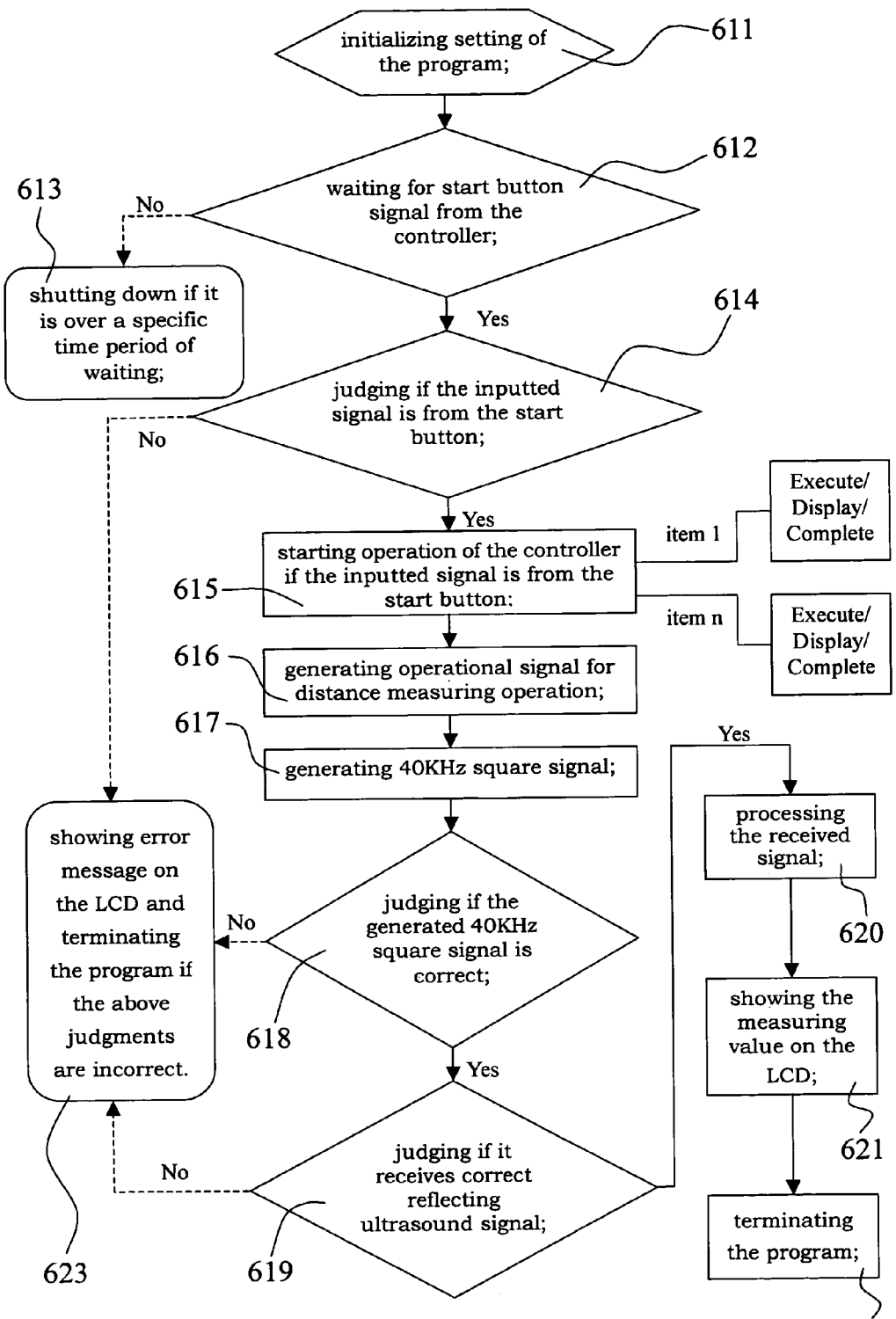
FIG. 6 shows a program flow diagram according to the invention.

FIG. 6 shows a program flow diagram according to the invention. It includes steps of:
  611,i.e.initializing setting of the program;
  612,i.e.waiting for start button signal from the controller;
  613,i.e.shutting down if it is over a specific time period of waiting;
  614,i.e.judging if the inputted signal is from the start button;
  615,i.e.starting operation of the controller if the inputted signal is from the start button;
  616,i.e.generating operational signal for distance measuring operation;

617, i.e. generating 40 KHz square signal;
618, i.e. judging if the generated 40 KHz square signal is correct;
619, i.e. judging if it receives correct reflecting ultrasound signal;
620, i.e. processing the received signal;
621, i.e. showing the measuring value on the LCD;
622, i.e. terminating the program; and
623, i.e. showing error message on the LCD 122 and terminating the program if the above judgments are incorrect.

A portable ultrasound height measuring apparatus of the invention has following advantages:

1. The invention emits ultrasound signal and receives reflecting ultrasound signal from ground. Unlike conventional height measuring apparatus, it does not need a heavy base and other large hardware, which makes it miniature and portable.
2. The display module of the invention can rotate and open with a specific angle to make it perpendicular to the measuring module of the invention. By placing the display module closely to a wall and placing the measuring module on the head top of the measured person, it can prevent error of measuring position.
3. The invention using ultrasound signal for emitting and receiving, and a digitizing display, which make a height measurement with high accuracy.
4. The invention can record a plurality of data, which provides people a historical records of height distribution for reference.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

The invention claimed is:

1. A portable ultrasound height measuring apparatus, which comprises:
   a display module, which comprises
      a first top lid and a first bottom lid, wherein the first top lid is positioned relative to the first bottom lid and has a container for a liquid crystal display (LCD), and a speaker fixture;
      a protective transparent plank for protecting the LCD located in the position of the first top lid relative to the container; and
      a skidproof pad embedded on a far side of the first bottom lid relative to the first top lid;
      a measuring module, which comprises:
      a second top lid and a second bottom lid wherein the second top lid is positioned relative to the second bottom lid and has a fillister for an ultrasound emitter, an ultrasound receiver, a set fingerboard, a microprocessor, and a start button;
      a container for the emitter and for the receiver located in the position of the second bottom lid relative to the emitter and receiver;
      a power supply box having a fillister for the start button relative to the second top lid;
      a plurality of openings with respect to the set fingerboard on the second top lid; the microprocessor is located under the set fingerboard; and
         wherein said display module and said measuring module are jointly connected together via a pivot, which makes the display module able to rotate, open and close relative to the measuring module in a set range of angles.

2. The height measuring apparatus of claim 1, wherein the set fingerboard and the relative microprocessor under the fingerboard are able to input alphanumeric data.

3. The height measuring apparatus of claim 1, wherein the skidproof pad is made by a soft plastic or rubber.

4. The height measuring apparatus of claim 1, wherein said display module and measuring module are jointly connected together and are able to be put into a box with similar or dissimilar shape.

5. The height measuring apparatus of claim 1, wherein the power supply box can contain a Mn battery, a Li battery, a solar cell, or a rechargeable battery.

* * * * *